(12) United States Patent
Yamashita et al.

(10) Patent No.: US 11,401,208 B2
(45) Date of Patent: Aug. 2, 2022

(54) SUBSTRATE AND MULTILAYER SUBSTRATE

(71) Applicant: TDK CORPORATION, Tokyo (JP)

(72) Inventors: Yasuhide Yamashita, Tokyo (JP); Masaaki Yamashita, Tokyo (JP)

(73) Assignee: TDK CORPORATION, Tokyo (JP)

( * ) Notice: Subject to any disclaimer, the term of this patent is extended or adjusted under 35 U.S.C. 154(b) by 101 days.

(21) Appl. No.: 16/835,553

(22) Filed: Mar. 31, 2020

(65) Prior Publication Data

US 2020/0317567 A1    Oct. 8, 2020

(30) Foreign Application Priority Data

Apr. 5, 2019 (JP) .............................. JP2019-073024

(51) Int. Cl.
| | | |
|---|---|---|
| *C03C 25/1095* | (2018.01) | |
| *C03C 25/42* | (2006.01) | |
| *C03C 25/47* | (2018.01) | |
| *B32B 5/02* | (2006.01) | |
| *B32B 5/26* | (2006.01) | |

(52) U.S. Cl.
CPC .......... *C03C 25/1095* (2013.01); *B32B 5/024* (2013.01); *B32B 5/26* (2013.01); *C03C 25/42* (2013.01); *C03C 25/47* (2018.01); *B32B 2250/20* (2013.01); *B32B 2255/02* (2013.01); *B32B 2255/20* (2013.01); *B32B 2262/101* (2013.01); *B32B 2264/102* (2013.01); *B32B 2264/107* (2013.01); *B32B 2307/302* (2013.01); *B32B 2457/00* (2013.01)

(58) Field of Classification Search
CPC ..... C03C 25/1095; C03C 25/36; C03C 25/42; C03C 25/47; B05D 2203/35; B05D 2252/00; B05D 2256/00; B32B 15/14; B32B 15/20; B32B 2250/20; B32B 2255/02; B32B 2255/20; B32B 2255/205; B32B 2260/021; B32B 2260/046; B32B 2262/101; B32B 5/024; B32B 5/028; B32B 5/26; D03D 15/267; B60R 2021/23514; B29B 15/10; Y10T 442/2992; Y10T 442/2098; Y10T 428/1362; Y10T 428/256; Y10T 428/257; Y10T 428/259; Y10T 428/31525
USPC ........... 257/E23.107; 51/308, 309, 307, 295; 442/180, 134, 136, 71, 99, 81; 428/36.1, 428/417, 323, 331, 329, 328
See application file for complete search history.

(56) References Cited

U.S. PATENT DOCUMENTS

| | | | | |
|---|---|---|---|---|
| 6,200,915 | B1* | 3/2001 | Adams ................... | D06N 3/128 442/157 |
| 2007/0222307 | A1* | 9/2007 | Sawa ....................... | H01B 3/04 310/45 |
| 2013/0045373 | A1* | 2/2013 | Adachi ................ | D03D 1/0082 428/219 |
| 2015/0290773 | A1* | 10/2015 | Banuelos ............. | B24D 11/005 51/295 |

FOREIGN PATENT DOCUMENTS

| | | |
|---|---|---|
| JP | H08-236884 A | 9/1996 |
| JP | H09-153666 A | 6/1997 |
| WO | WO-2018194163 A1 * 10/2018 | .......... H01M 4/0433 |

* cited by examiner

*Primary Examiner* — Camie S Thompson
(74) *Attorney, Agent, or Firm* — Oliff PLC (57) ABSTRACT

A substrate includes a fabric-like member. First inorganic fillers exist on a surface of the fabric-like member.

12 Claims, 9 Drawing Sheets

SUBSTRATE AND MULTILAYER SUBSTRATE

BACKGROUND OF THE INVENTION

The present invention relates to a substrate and a multilayer substrate and, for example, relates to a substrate and a multilayer substrate including a fabric-like member.

For high densification due to miniaturization of electronic devices, various methods for improving heat dissipation of circuit board have been recently studied.

For example, Patent Document 1 discloses a metal substrate for circuit in which a glass fiber non-woven fabric is coated with a resin mixed with inorganic fillers for improvement in heat dissipation.

Patent Document 2 discloses that a method of mixing and immersing inorganic material (e.g., glass fiber, boron nitride) is employed for improvement in heat dissipation and for adjustment in coefficient of thermal expansion in forming a resin layer.

However, the conventional method is insufficient for heat dissipation of the substrate. For example, heat dissipation can be improved by containing inorganic fillers as shown in Patent Document 2, but from a more microscopic point of view, the inorganic fillers cannot be arranged in small gaps among particles or glass cloth. Thus, there is a limit to the conventional method for efficient improvement in heat dissipation.

Patent Document 1: JPH08236884 (A)
Patent Document 2: JPH09153666 (A)

BRIEF SUMMARY OF INVENTION

The present invention has been achieved under such circumstances. It is an object of the invention to provide a substrate and a multilayer substrate having a high heat dissipation.

That is, an embodiment of the present invention is as follows.

[1] A substrate includes a fabric-like member, wherein first inorganic fillers exist on a surface of the fabric-like member.
[2] The substrate according to [1], wherein the fabric-like member is composed of glass.
[3] The substrate according to [1] or [2], wherein the first inorganic fillers are at least one of boron nitride, aluminum oxide, aluminum nitride, and magnesium oxide.
[4] The substrate according to any of [1] to [3], wherein each of the first inorganic fillers has a particle size smaller than a cross-sectional diameter of each of threads constituting the fabric-like member.
[5] The substrate according to any of [1] to [4], wherein each of the first inorganic fillers has a particle size of 1 μm or less.
[6] The substrate according to any of [1] to [5] further includes second inorganic fillers each having a particle size larger than that of each of the first inorganic fillers.
[7] The substrate according to [6], wherein each of the second inorganic fillers has a scaly shape, and each of the second inorganic fillers has a longitudinal length of 5 μm to 15 μm.
[8] The substrate according to any of [1] to [7], wherein aggregates of the first inorganic fillers exist on the surface of the fabric-like member.
[9] The substrate according to claim [8], wherein the aggregates of the first inorganic fillers exist closely to threads contained in the fabric-like member.
[10] The substrate according to [8] or [9] further includes second inorganic fillers each having a particle size larger than that of each of the first inorganic fillers, wherein the aggregates of the first inorganic fillers exist to connect the fabric-like member and the second inorganic fillers.
[11] The substrate according to any of [8] to [10], wherein first threads and second threads are crossed and woven to form the fabric-like member, and at least one of the aggregates of the first inorganic fillers are contained in intersections between the first threads and the second threads.
[12] The substrate according to any of [8] to [11], wherein the aggregates of the first inorganic fillers exist in a range of 10 μm or more along the first threads.
[13] The substrate according to any of [8] to [12], wherein the aggregates of the first inorganic fillers exist in a range of 5 μm or more from a transverse end of the first threads in a direction perpendicular to a longitudinal direction of the first threads.
[14] The substrate according to any of [8] to [13], wherein at least one of the first inorganic fillers exist within a range of 1 μm or less from a transverse end of the first threads in a direction perpendicular to a longitudinal direction of the first threads.
[15] A multilayer substrate is formed from two or more laminated substrates according to any of [1] to [14].

DETAILED DESCRIPTION OF INVENTION

1. Multilayer Substrate

Figure 1:
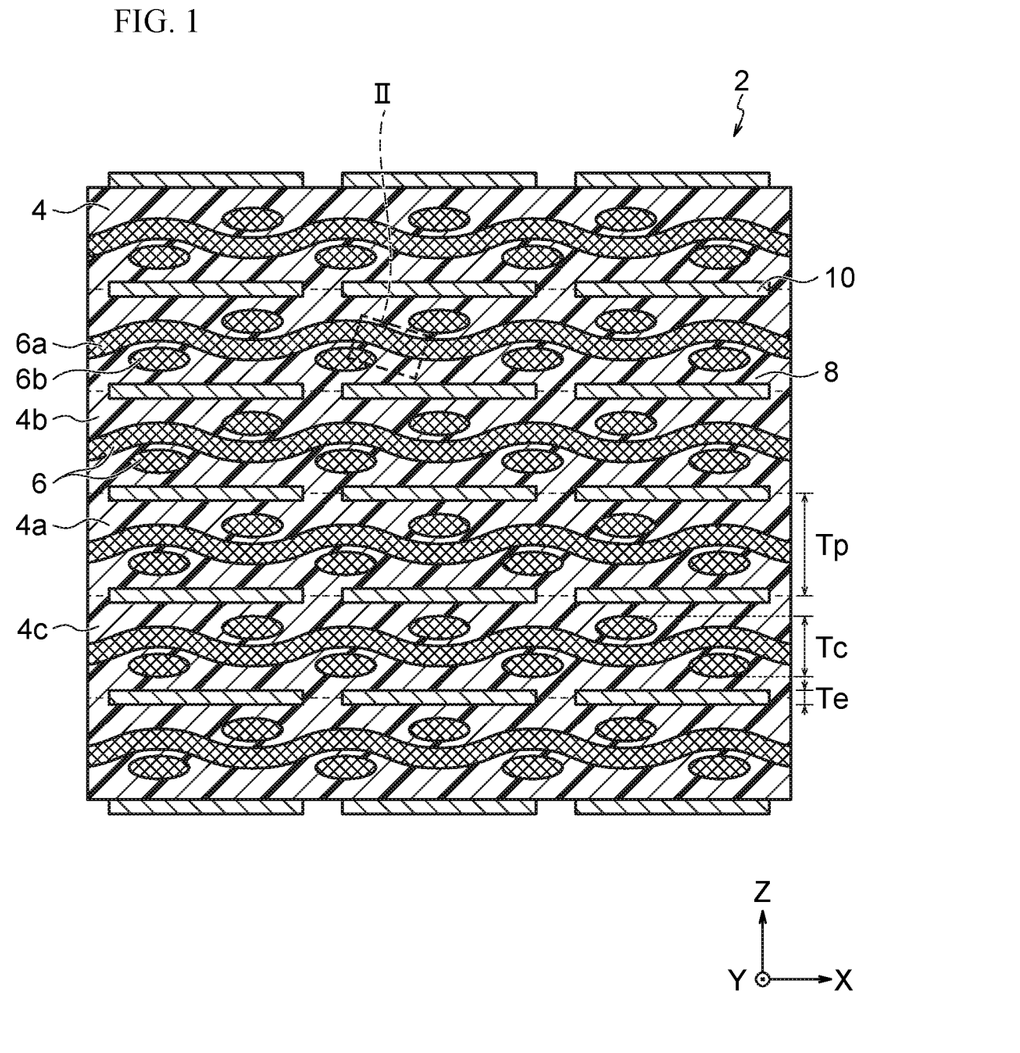
FIG. 1 is a schematic cross-sectional view of a substrate according to an embodiment of the present invention.

As shown in FIG. 1, a multilayer substrate 2 according to an embodiment of the present invention includes substrates 4 containing fabric-like members 6 and a resin part 8 and conductive layers 10. Although not illustrated in FIG. 1, the substrates 4 according to the embodiment of the present invention further includes first inorganic fillers, and the first inorganic fillers exist on the surface of each of the fabric-like members 6.

As shown in FIG. 1, the conductive layers 10 and the substrates 4 substantially parallel to the plane including the X-axis and the Y-axis are alternately laminated in the Z-axis direction, and a substrate 4a and another adjacent substrate 4b are partly laminated without the conductive layer 10. This is because a circuit is formed on each of the conductive layers 10 and is patterned.

Here, the X-axis, the Y-axis, and the Z-axis are perpendicular to each other.

Moreover, "substantially parallel" means that most parts are parallel, but there may be a part that is not slightly parallel. The substrates 4 and the conductive layers 10 may be slightly uneven or inclined.

The substrate thickness Tp is not limited, but is preferably 20 μm to 300 μm (more preferably, 70 μm to 200 μm), where Tp is a distance from a boundary between the substrate 4a and the adjacent another substrate 4b to a boundary between the substrate 4a and the other adjacent another substrate 4c.

1-1. Substrates

As shown in FIG. 1, each of the substrates 4 according to the present embodiment includes the fabric-like member 6 and the resin part 8. Although not illustrated in FIG. 1, each of the substrates 4 according to the present embodiment further includes first inorganic fillers and is structured in such a manner that the resin part 8 is held by the fabric-like member 6 of which the first inorganic fillers exist on the surface.

Each of the fabric-like members 6 according to the present embodiment includes first threads 6a arranged substantially in parallel to the X-axis direction and second threads 6b arranged substantially in parallel to the Y-axis direction. Here, "substantially in parallel" means that, since the first threads 6a and the second threads 6b are alternately woven, the first threads 6a are not completely parallel to the X-axis but are slightly inclined to the X-axis, and the second threads 6b are not completely parallel to the Y-axis but are slightly inclined to the Y-axis.

Figure 2:
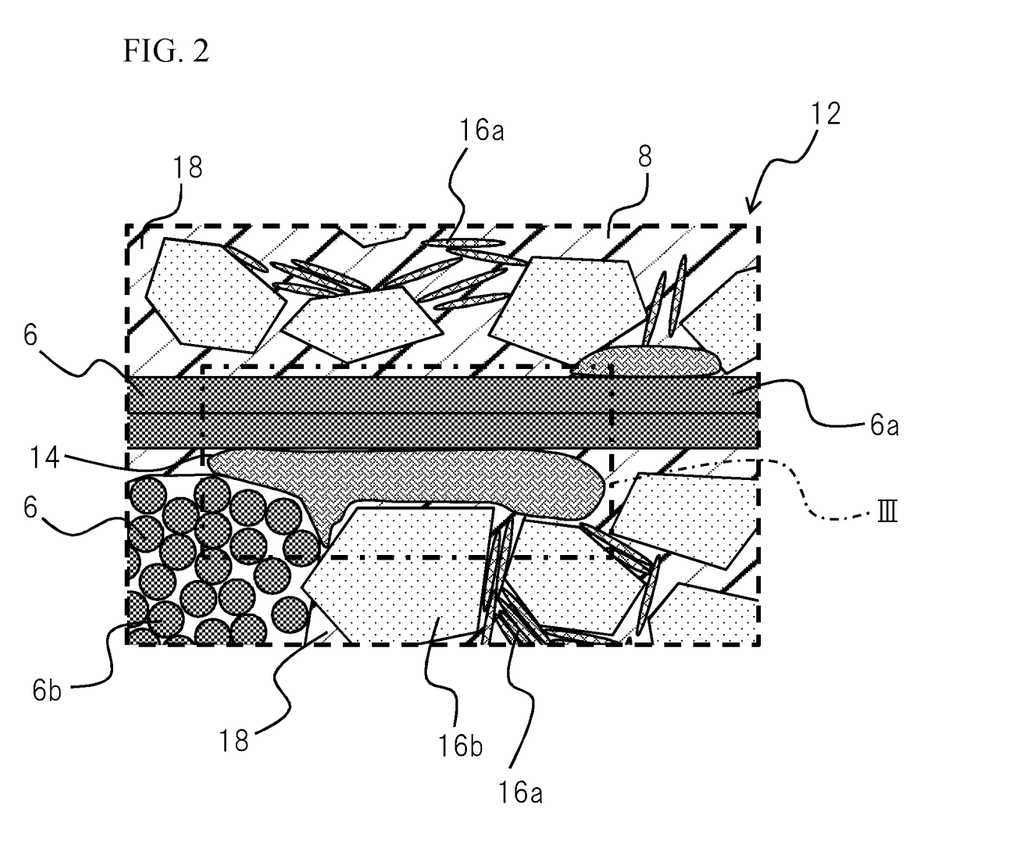
FIG. 2 is a schematic cross-sectional view of the II part of the substrate shown in FIG. 1.

FIG. 2 is an enlarged cross-sectional view of the II part of the multilayer substrate 2 shown in FIG. 1. The II part includes an intersection between the first threads 6a and the second threads 6b of the fabric-like member 6. The intersection between the first threads 6a and the second threads 6b is an area between the first threads 6a and the second threads 6b.

As shown in FIG. 2, each of the first threads 6a and the second threads 6b of the fabric-like member 6 are formed from multiple fibers. In the present embodiment, the first inorganic fillers exist on the surface of the fabric-like member 6.

In general, the thermal conductivity of the resin part 8 is lower than that of the fabric-like member 6. In addition, the thermal conductivity of the first inorganic fillers is higher than that of each of the resin part 8 and the fabric-like member 6. From these relations, there is a problem with low heat dissipation of the substrate 4 due to low thermal conductivity of the resin part 8. In the substrate 4 according to the present embodiment, however, the first inorganic fillers having a comparatively high thermal conductivity exist on the surface of the fabric-like member 6. Thus, compared to when the fabric-like member 6 and the resin part 8 are directly contacted with each other, it becomes easy to discharge heat from the fabric-like member 6 via the first inorganic fillers, and the substrate 4 can thereby have a high heat dissipation. As mentioned below, the resin part 8 has a high thermal conductivity by containing not only the first inorganic fillers but second inorganic fillers 16a and 16b, and the substrate 4 can thereby have a further higher heat dissipation.

Here, the surface of the fabric-like member 6 is a close part to the fabric-like member 6. Incidentally, the close part to the fabric-like member 6 includes not only a part directly contacted with the fabric-like member 6, but a part slightly away from the fabric-like member 6. For example, the surface of the fabric-like member 6 is a range of 1 μm or less (preferably, 0.8 μm or less) from a transverse end of the first threads 6a or the second threads 6b constituting the fabric-like member 6.

Incidentally, the transverse direction of the first threads 6a or the second threads 6b constituting the fabric-like member 6 is a radial direction of the first threads 6a or the second threads 6b.

In the present embodiment, aggregates 14 of the first inorganic fillers preferably exist on the surface of the fabric-like member 6. This makes it possible to further enhance the heat dissipation of the substrate 4. In the present embodiment, the aggregates 14 of the first inorganic fillers exist closely to at least either of the first threads 6a and the second threads 6b contained in the fabric-like member 6. This makes it possible to further improve the heat dissipation of the substrate 4.

In the present specification, "the aggregates 14 of the first inorganic fillers" means a state where 20 or more first inorganic fillers (preferably, 30 or more first inorganic fillers) exist in 5 μm square area.

Incidentally, FIG. 2 illustrates the mass of the first inorganic fillers as "the aggregates 14 of the first inorganic fillers", but micro particles of the first inorganic fillers are actually aggregated on the surfaces of the fabric-like members 6.

In the present specification, "the aggregates 14 of the first inorganic fillers" means not only a state where micro particles of the first inorganic fillers exist as a mass as shown in FIG. 2, but also means a state where micro particles of the first inorganic fillers are continuously present along the first threads 6a or the second threads 6b.

Figure 3:
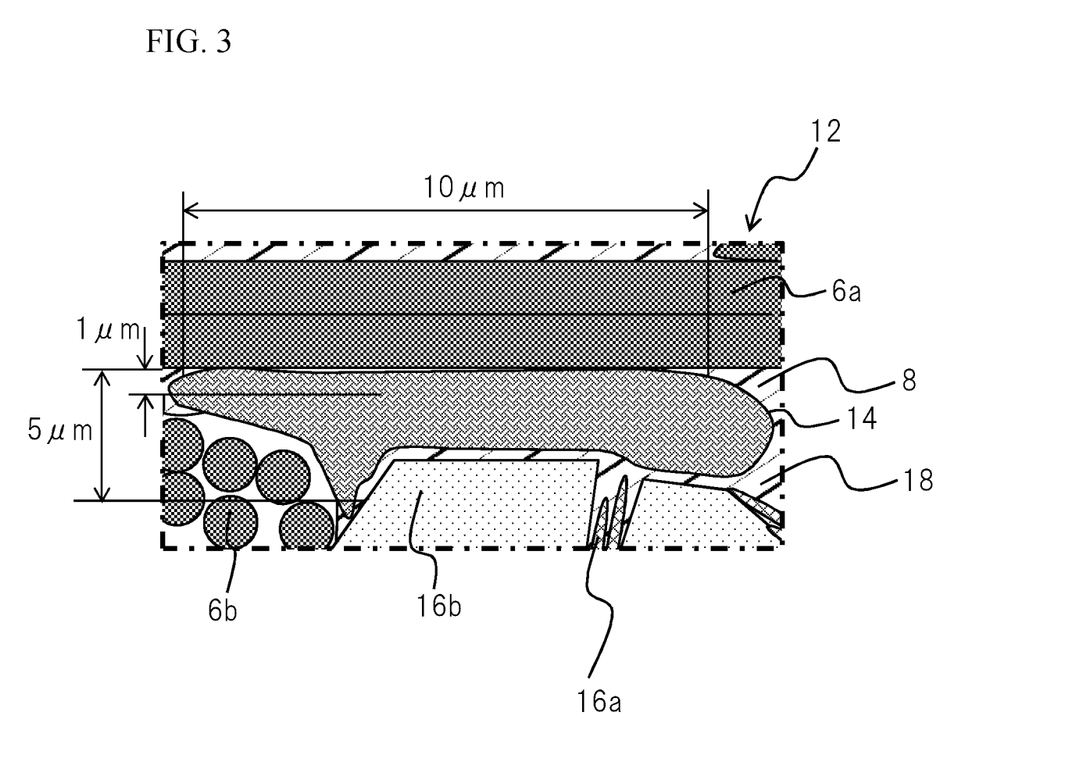
FIG. 3 is a schematic cross-sectional view of the III part of the substrate shown in FIG. 2.

FIG. 3 is an enlarged cross-sectional view of the III part of the multilayer substrate 2 shown in FIG. 2 and is a Z-X cross section obtained by cutting the multilayer substrate 2 in parallel to the Z-X plane.

On the Z-X cross section, preferably, the aggregates 14 of the first inorganic fillers exist in a range of 10 μm or more along the first threads 6a. This makes it possible to further enhance the heat dissipation of the substrate 4. On the Z-X cross section, more preferably, the aggregates 14 of the first inorganic fillers exist in a range of 30 μm or more along the first threads 6a.

On the Z-X cross section, preferably, the aggregates 14 of the first inorganic fillers exist in a range of 5 μm or more from a transverse end of the first threads 6a in a direction perpendicular to a longitudinal direction of the first threads 6a. This makes it possible to further enhance the heat dissipation of the substrate 4. On the Z-X cross section, more preferably, the aggregates 14 of the first inorganic fillers exist in a range of 10 μm or more from a transverse end of the first threads 6a in a direction perpendicular to a longitudinal direction of the first threads 6a.

Preferably, the aggregates 14 of the first inorganic fillers exist closely on the surfaces of the fabric-like members 6. On the Z-X cross section, preferably, the aggregates 14 of the first inorganic fillers exist in a range of 1 μm or less from a transverse end of the first threads 6a in a direction perpendicular to a longitudinal direction of the first threads 6a. This makes it possible to further enhance the heat dissipation of the substrate 4. On the Z-X cross section, more preferably, the aggregates 14 of the first inorganic fillers exist in a range of 0.8 μm or less from a transverse end of the first threads 6a in a direction perpendicular to a longitudinal direction of the first threads 6a.

In the present embodiment, at least one of the aggregates 14 of the first inorganic fillers are contained in intersections between the first threads 6a and the second threads 6b.

The intersections between the first threads 6a and the second threads 6b have a comparatively low heat dissipation in the fabric-like member 6. In the present embodiment, since at least one of the aggregates 14 of the first inorganic fillers are contained at the intersections between the first threads 6a and the second threads 6b, the heat dissipation of the substrate 4 can be further higher.

Incidentally, the intersections between the first threads 6a and the second threads 6b are very narrow, and even inorganic fillers having a thickness of about 1 μm are conventionally hard to exist at the intersections between the first threads 6a and the second threads 6b.

In the present embodiment, however, the first inorganic fillers can exist at the intersections between the first threads 6a and the second threads 6b in the following manner of electrostatic attraction (the fabric-like members 6 and the first inorganic fillers are electrically charged and electrostatically attracted), physical or chemical attachment (the first inorganic fillers are physically or chemically attached onto the fabric-like members 6), or the like.

As shown in FIG. 1, Tc/Tp is preferably 0.2-0.8, more preferably 0.3-0.7, where Tc is a thickness of the fabric-like member 6 contained in the substrate 4. This makes it possible to further enhance the heat dissipation of the substrate 4 and makes it easy to bend the substrate 4. This also makes it possible to appropriately ensure the insulation of the substrate 4.

1-1-1. Fabric-Like Members

There is no upper limit to the thickness of each of the fabric-like members 6 according to the present embodiment. Each of the fabric-like members 6 according to the present embodiment has a thickness (Tc) of 20 μm or more and 100 μm or less (particularly, preferably, 75 μm or less). This makes it possible to further enhance the heat dissipation of the substrate 4 and makes it easy to bend the substrate 4. This also makes it possible to appropriately ensure the strength of the substrate 4. This also makes it easy to immerse the following resin paste into the fabric-like member 6. More preferably, the fabric-like member 6 according to the present embodiment has a thickness of 60 μm or less. The thickness of the fabric-like member 6 according to the present embodiment has no lower limit, but is, for example, 10 μm or more. This makes it possible to appropriately ensure the strength of the substrate 4.

The first threads 6a and the second threads 6b constituting the fabric-like members 6 according to the present embodiment may have the same or different cross-sectional sizes and shapes.

There is no limit to the cross-sectional size in the thickness direction of the fabric-like member 6 of the first threads 6a and the second threads 6b. Preferably, the cross-sectional size in the thickness direction of the fabric-like member 6 of the first threads 6a and the second threads 6b is 2 μm to 10 μm (more preferably, 3 μm to 5 μm). There is no limit to the cross-sectional size in the plane direction of the fabric-like member 6 of the first threads 6a and the second threads 6b. Preferably, the cross-sectional size in the plane direction of the fabric-like member 6 of the first threads 6a and the second threads 6b is 2 μm to 10 μm (more preferably, 3 μm to 5 μm).

There is no limit to the net opening rate of the fabric-like member 6 obtained by the following formula. Incidentally, the net opening rate of the present embodiment means a net opening rate of a mesh of the fabric-like member 6. In the present embodiment, the net opening rate is preferably 30% or more. This makes it possible to ensure an appropriate insulation of the substrate 4 while further enhancing the heat dissipation of the substrate 4.

Net Opening Rate [%]=100×(total area of net openings)/(area of fabric-like member including net openings)

The fabric-like member 6 of the present embodiment is unplugged to form holes. This makes it easy to immerse the following resin paste into the fabric-like member 6 and makes it possible to further enhance the heat dissipation of the substrate 4. This also makes it possible to increase the surface area of the fabric-like member 6 and thereby makes it possible to increase the attachment amount of the first inorganic fillers.

The porosity of the fabric-like member 6 according to the present embodiment obtained by the following formula is not limited, but is preferably 30% to 70%. This makes it possible to ensure appropriate insulation and strength while further enhancing the heat dissipation of the substrate 4.

Incidentally, the porosity is represented by "Porosity [%]=100×(total area of holes)/(area of fabric-like member 6 including holes and net openings).

In the numerator of the above-mentioned formula, "total area of holes" excludes areas of net openings.

Incidentally, each of the holes of the fabric-like member 6 has any shape (e.g., polygonal shape, circular shape).

The fabric-like member 6 according to the present embodiment may be composed of any material, such as an inorganic based material, an organic based material, and their mixture. For example, the inorganic based material is glass, aluminum oxide, silicon oxide, boron oxide, silicon carbide, silicon nitride, zirconium oxide, etc. For example, the organic based material is carbon, cellulose, aramid, polyetheretherketone, polyetherimide, polyethersulfone, etc. These may be used independently or in combination.

For example, the fabric-like member 6 according to the present embodiment is composed of glass. When the fabric-like member 6 is composed of glass, it is possible to obtain the substrate 4 being easily bendable and having a high bending strength. Since glass does not easily undergo thermal expansion and contraction and does not easily change in volume due to drying and swelling, glass is easy to handle in manufacturing the substrate 4 and using it.

Moreover, when the fabric-like member 6 according to the present embodiment is composed of glass, the substrate 4 tends to exhibit a low heat dissipation due to low thermal conductivity of glass. In the present embodiment, however, a composite fabric-like member 26 (the first inorganic fillers having a comparatively high thermal conductivity are attached on the fabric-like member 6) can be used for the substrate 4, and the heat dissipation of the substrate 4 can thereby appropriately be secured even if the fabric-like member 6 is composed of glass.

1-1-2. First Inorganic Fillers

Preferably, each of the first inorganic fillers according to the present embodiment has a particle size smaller than a cross-sectional diameter of each of threads (the first threads 6a and the second threads 6b) constituting the fabric-like member 6. This makes it possible to arrange the first inorganic fillers closely to the intersections between the first threads 6a and the second threads 6b of the fabric-like member 6 and further makes it possible to increase the density of the first inorganic fillers. As a result of these effects, the heat dissipation of the substrate 4 can be further higher.

Preferably, each of the first inorganic fillers according to the present embodiment has a particle size of 1 μm or less (more preferably, 0.05 μm to 0.9 μm).

There is no limit to the amount of the first inorganic fillers according to the present embodiment. In the present embodiment, preferably, the ratio of the first inorganic fillers to the substrate 4 is 0.2 vol % to 5 vol %. This makes it possible to ensure appropriate strength and insulation for the substrate 4 while enhancing the heat dissipation of the substrate 4. In the present embodiment, more preferably, the ratio of the first inorganic fillers to the substrate 4 is 0.5 vol % to 3 vol %.

The first inorganic fillers according to the present embodiment are composed of at least one of boron nitride, aluminum oxide, aluminum nitride, and magnesium oxide. This makes it possible to ensure an appropriate insulation for the substrate 4 while enhancing the heat dissipation of the substrate 4. In the present embodiment, preferably, the first inorganic fillers are composed of at least one of boron nitride, aluminum oxide, and magnesium oxide (more preferably, boron nitride). The first inorganic fillers may be composed of one material or two or more materials.

1-1-3. Resin Part

As shown in FIG. 1, each of the substrates 4 according to the present embodiment includes the resin part 8.

1-1-3-1. Second Inorganic Fillers

Each of the second inorganic fillers 16a (16b) according to the present embodiment has a particle size larger than that of each of the first inorganic fillers. Since each of the first inorganic fillers has a small particle size as mentioned above, the first inorganic fillers can be arranged closely to the intersections between the first threads 6a and the second threads 6b of the fabric-like member 6 by obtaining the following composite fabric-like member 26.

On the other hand, compared to the first inorganic fillers, the second inorganic fillers 16a (16b) according to the present embodiment have a large particle size and are thereby arranged away from the intersections between the first threads 6a and the second threads 6b of the fabric-like member 6. As a result, the aggregates 14 of the first inorganic fillers can be arranged to connect the second inorganic fillers 16a (16b) and the fabric-like member 6. Thus, the heat of the fabric-like member 6 is discharged to the second inorganic fillers 16a (16b) via the aggregates 14 of the first inorganic fillers, and the heat dissipation of the substrate 4 can be further higher.

The second inorganic fillers 16a (16b) according to the present embodiment are composed of any material. For example, the second inorganic fillers 16a (16b) according to the present embodiment are at least one of boron nitride, aluminum oxide, magnesium oxide, and aluminum nitride. This makes it possible to appropriately ensure the insulation for the substrate 4 while enhancing the heat dissipation of the substrate 4. Preferably, the second inorganic fillers 16a (16b) are composed of at least one of boron nitride, aluminum oxide, and magnesium oxide (more preferably, boron nitride). The second inorganic fillers 16a (16b) may be composed of one material or two or more materials. The first inorganic fillers and the second inorganic fillers 16a (16b) may be composed of the same material or different materials.

The second inorganic fillers 16a (16b) have any shape. When the second inorganic fillers are composed of boron nitride, the second inorganic fillers 16a (16b) may have a scaly shape as shown in FIG. 2 and FIG. 3 (the second inorganic fillers 16a).

When each of the second inorganic fillers 16a has a scaly shape, each of the second inorganic fillers 16a has anisotropy in heat dissipation, that is, thermal conductivity. Specifically, the thermal conductivity of the scaly shape is higher in the longitudinal direction than in the transverse direction.

Thus, as shown in FIG. 2 and FIG. 3, the longitudinal ends of the second inorganic fillers 16a (boron nitride) are preferably directed to the aggregates 14 of the first inorganic fillers. This makes it possible to favorably discharge heat from the fabric-like member 6 to the second inorganic fillers 16a via the first inorganic fillers.

When the second inorganic fillers are magnesium oxide, the second inorganic fillers may have a particle shape as shown in FIG. 2 (the second inorganic fillers 16b).

The second inorganic fillers 16a (16b) may have any particle size that is larger than a particle size of the first inorganic fillers. When the second inorganic fillers 16a have a scaly shape, the longitudinal length is preferably 3 μm to 20 μm (particularly preferably, 5 μm to 15 μm). When the second inorganic fillers 16b have a particle shape, the particle size is preferably 3 μm to 20 μm (more preferably, 5 μm to 15 μm).

In the present embodiment, the amount of the second inorganic fillers 16a (16b) contained in the resin part 8 is not limited, but is preferably 40 vol % to 80 vol %. This makes it possible to enhance the heat dissipation of the substrate 4 and makes it easy to attach a metal foil onto the substrate 4 in employing the metal foil as the conductive layer 10.

1-1-3-2. Resin

Known thermosetting resins can be used for a resin 18 constituting the resin part 8 according to the present embodiment. Specifically, the resin 18 is epoxy resin, phenol resin, cyanate resin, triazine resin, polyimide resin, polyamideimide resin, silicone resin, melamine resin, urea resin, furan resin, alkyd resin, polyester resin, diallyl phthalate resin, etc. One of these resins may be used independently, or two or more of these resins may be used in combination.

Preferably, the resin 18 according to the present embodiment is at least one of epoxy resin, phenol resin, and triazine resin. This makes it possible to obtain the substrate 4 having a high heat resistance. More preferably, the resin 18 according to the present embodiment is epoxy resin. This enhances the adhesion of the resin part 8 to the fabric-like member 6.

1-2. Conductive Layers

There is no limit to the thickness Te of the conductive layer 10 according to the present embodiment shown in FIG. 1. Preferably, the conductive layer 10 has a thickness Te of 1 μm to 200 μm (more preferably, 30 μm to 150 μm).

The conductive layer 10 according to the present embodiment is formed in any manner. The conductive layer 10 may be a metal foil or may be formed by applying or spraying a metal paste or a conductive resin paste and drying it or by sputtering. In the present embodiment, preferably, the conductive layer 10 is a metal foil.

The metal foil used in the present embodiment is any metal foil, such as copper foil, gold foil, and aluminum foil, but is preferably copper foil. This makes it possible to obtain the conductive layer 10 having a high thermal conductivity and an excellent electric conductivity.

The conductive layer 10 according to the present embodiment may have a double layer structure of the metal foil and a predetermined element or alloy or a triple layer structure where a predetermined element, alloy, etc. is interposed by the metal foils. The predetermined element is nickel, tin, lead, iron, etc. The predetermined alloy is an alloy combining nickel, tin, lead, and iron, an alloy of nickel, tin, lead, iron, and phosphorus, etc.

2. Method of Manufacturing Multilayer Substrate

Figure 4A:
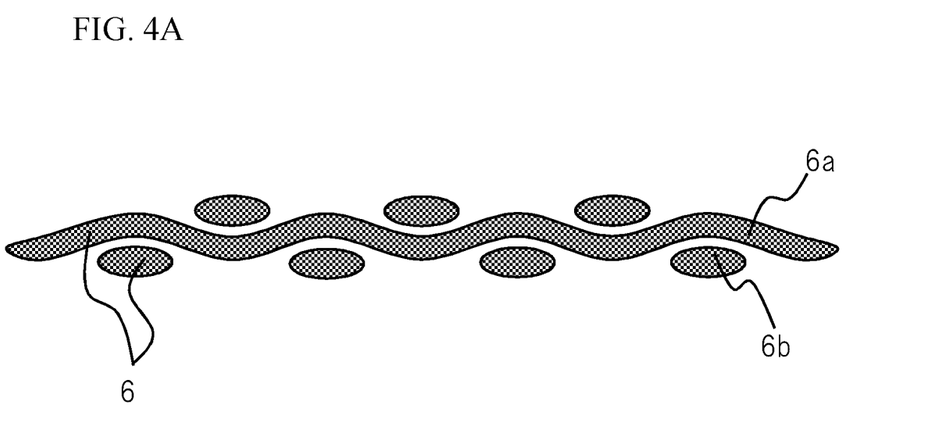
FIG. 4A is a schematic cross-sectional view of a fabric-like member.
Figure 4B:
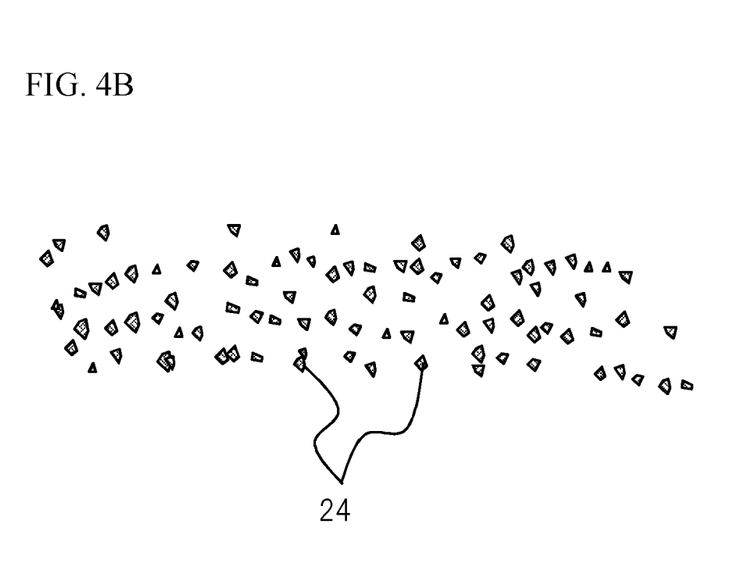
FIG. 4B is a schematic cross-sectional view of first inorganic fillers.
Figure 4C:
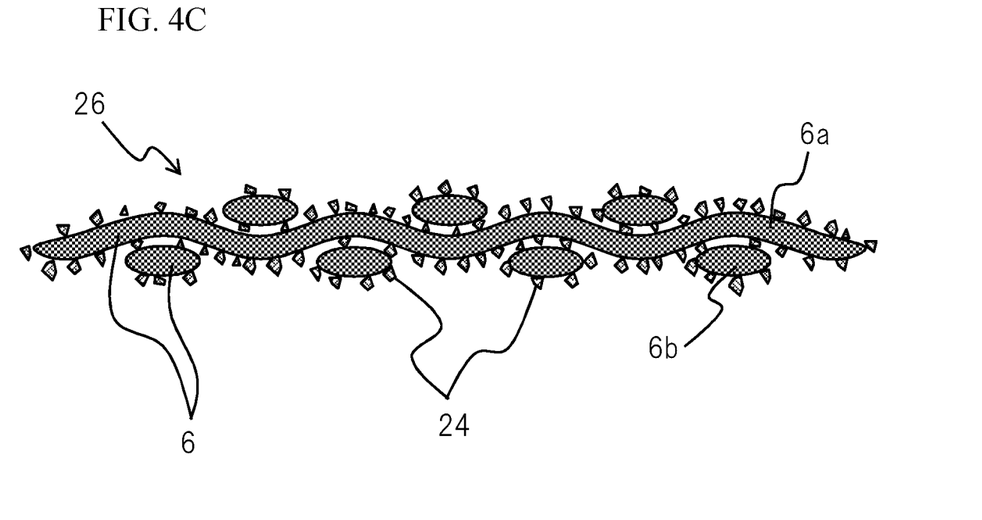
FIG. 4C is a schematic cross-sectional view of a composite fabric-like member on which first inorganic fillers are electrostatically attracted.

In the present embodiment, as shown in FIG. 4C, the multilayer substrate 2 is manufactured using a composite fabric-like member 26 of which the first inorganic fillers 24 exist on the surface. The composite fabric-like member 26 is manufactured by a known method.

For example, the composite fabric-like member 26 is manufactured by electrically charging the surface of the fabric-like member 6 shown in FIG. 4A and attaching the first inorganic fillers 24 shown in FIG. 4B onto the surface. When the fabric-like member 6 is positively electrically charged, the first inorganic fillers 24 are negatively electrically charged. On the other hand, when the fabric-like member 6 is negatively electrically charged, the first inorganic fillers 24 are positively electrically charged.

The composite fabric-like member 26 can also be manufactured by physically attaching the first inorganic fillers 24 onto the fabric-like member 6. For example, the first inorganic fillers 24 are sprayed against the fabric-like member 6 with air brush. In this case, the amount of the first inorganic fillers 24 attached on the fabric-like member 6 can be controlled by adjusting the spray time.

The composite fabric-like member 26 can also be manufactured by chemically attaching the first inorganic fillers 24 onto the fabric-like member 6. For example, the following method can be employed. A solvent having a high bondability with the first inorganic fillers 24 is applied on the fabric-like member 6, and this fabric-like member 6 is immersed into a solution containing the first inorganic fillers 24. After that, the fabric-like member 6 and the first inorganic fillers 24 are bonded by heat treatment or so. The amount of the first inorganic fillers 24 attached on the fabric-like member 6 can be controlled by adjusting the concentration of the first inorganic fillers 24 in the solution containing the first inorganic fillers 24.

A resin paste containing the resin 18 constituting the resin part 8, the second inorganic fillers 16, a solvent, and the like is put into the composite fabric-like member 26 obtained in the above-mentioned manner and dried to manufacture a substrate green sheet (prepreg).

In addition to the above-mentioned materials, the resin paste may contain a curing agent, a curing accelerator, a dispersant, an elastomer, etc.

There is no limit to the curing agent. When the thermosetting resin is epoxy resin, the curing agent can be a polyaddition type curing agent, a catalyst type curing agent, etc. The polyaddition type curing agent is an acid anhydride based curing agent, an amine based curing agent, a phenol based curing agent, a mercaptan based curing agent, etc. The catalyst type curing agent is imidazole, or the like. The curing agent may consist of one type or two or more types.

There is no limit to the curing accelerator. When the curing agent is a phenol based curing agent, the curing accelerator is imidazole based compounds, organic phosphorus based compounds, tertiary amines, quaternary ammonium salts, etc. The curing accelerator may consist of one type or two or more types.

There is no limit to the solvent. The solvent is methyl ethyl ketone, cyclohexanone, etc.

The resin paste is put into the composite fabric-like member 26 in any manner. For example, the composite fabric-like member 26 may be dipped in the resin paste, or the resin paste may be put into the composite fabric-like member 26 by applying the resin paste to a support member, placing the composite fabric-like member 26 thereon, and pushing the composite fabric-like member 26 against the resin paste.

There is no limit to the solid content of the resin 18 in the resin paste. Preferably, the solid content of the resin 18 in the resin paste is 30 vol % to 70 vol %.

After the resin paste is put into the composite fabric-like member 26, they are dried to remove the solvent contained in the resin paste.

The dry temperature and the dry time for removing the solvent are not limited and can appropriately be determined based on the type of the solvent. For example, when the solvent is methyl ethyl ketone, cyclohexanone, etc., the dry temperature is 60° C. to 150° C., and the dry time is about one minute to two hours.

Incidentally, at this time, the solvent does not need to be completely removed and may partly remain.

The substrate green sheet obtained in such a manner is hardened to obtain the substrate 4. When the resin 18 is thermosetting resin, the substrate green sheet is heated at a heating temperature determined based on the curing temperature of the resin 18.

Figure 5A:
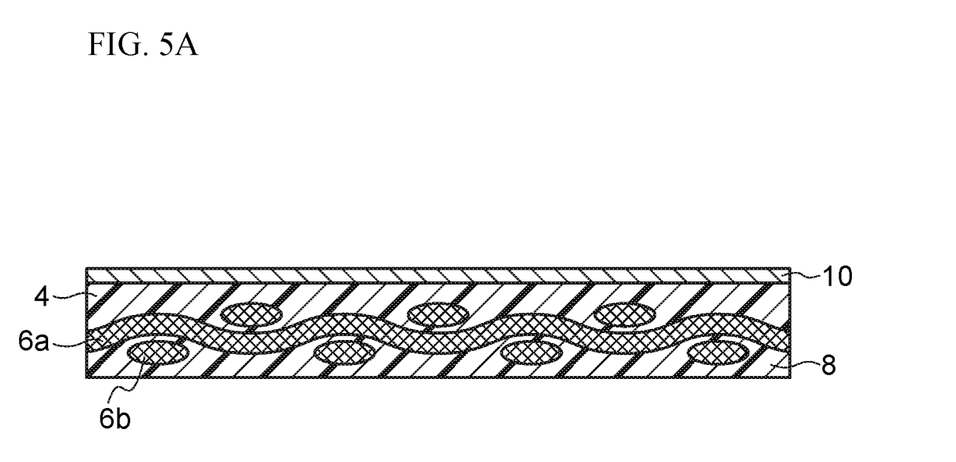
FIG. 5A is a schematic cross-sectional view illustrating a method of manufacturing a multilayer substrate according to an embodiment of the present invention.

Next, as shown in FIG. 5A, the conductive layer 10 is formed on either surface or both surfaces of the substrate 4. When the conductive layer 10 is a metal foil, the metal foil can be disposed on either surface or both surfaces of the substrate 4 by heat pressing.

Figure 5B:
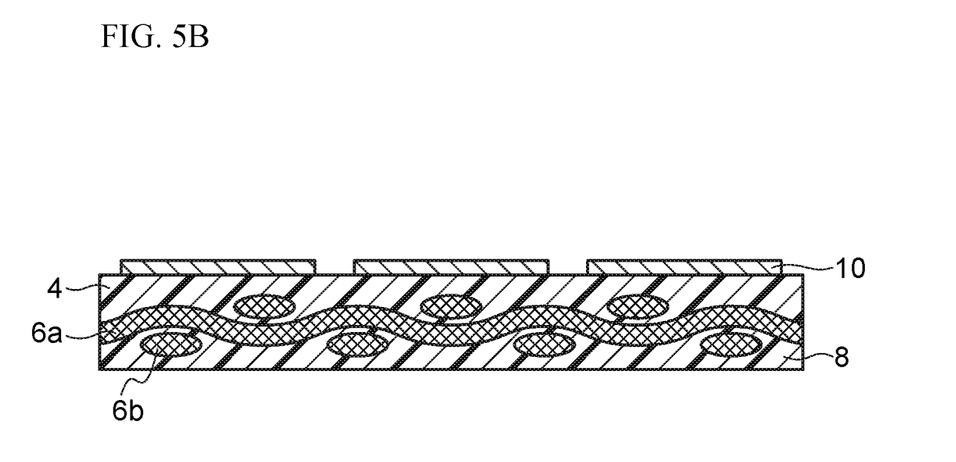
FIG. 5B is a schematic cross-sectional view illustrating a method of manufacturing a multilayer substrate according to an embodiment of the present invention.

Next, as shown in FIG. 5B, the conductive layer 10 (metal foil) is patterned by etching to form a circuit.

Figure 5C:
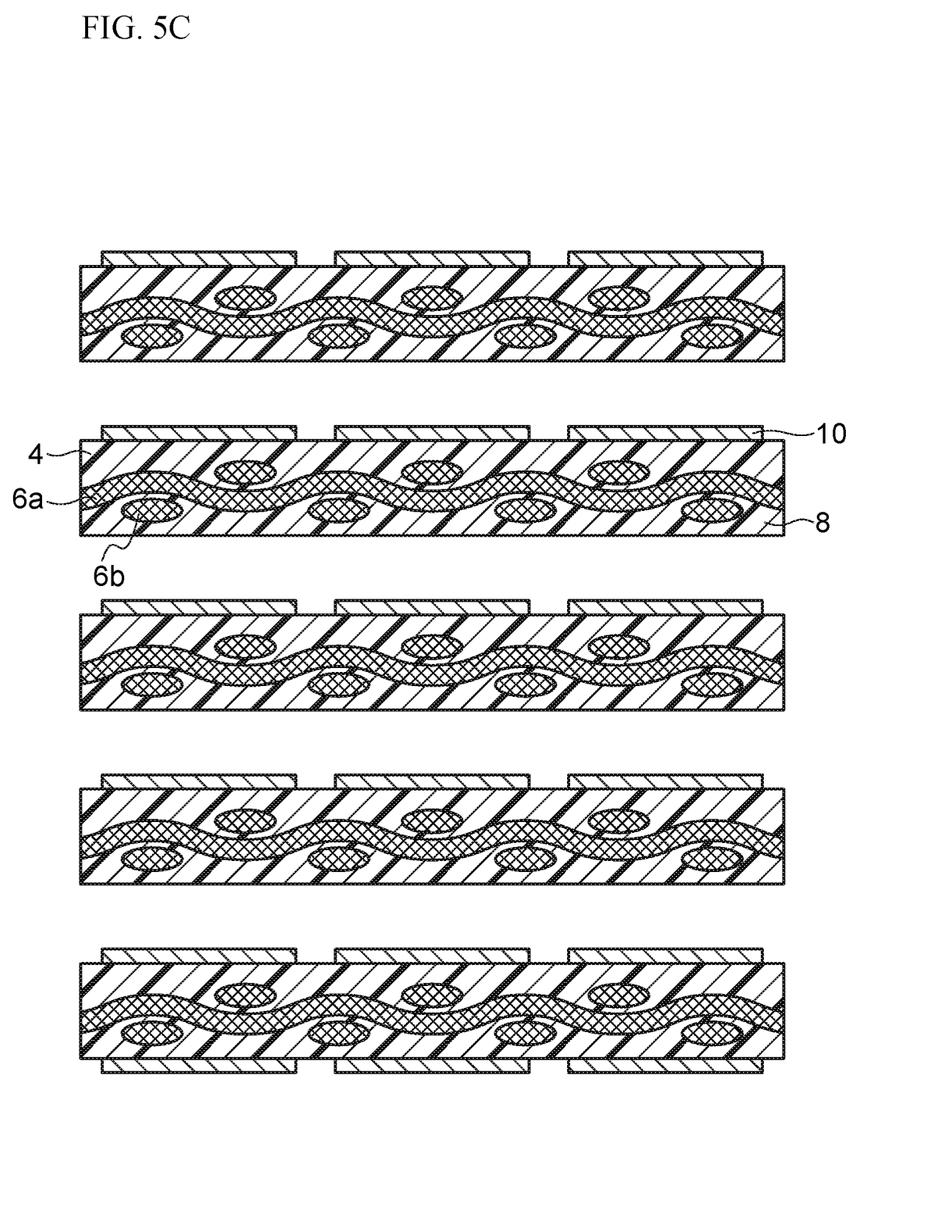
FIG. 5C is a schematic cross-sectional view illustrating a method of manufacturing a multilayer substrate according to an embodiment of the present invention.

A plurality of complexes of the substrate 4 and the conductive layer 10 obtained in such a manner is laminated as shown in FIG. 5C and pressed with heat. Then, the multilayer substrate 2 shown in FIG. 1 can be obtained.

3. Summary of Present Embodiment

The present embodiment explained in the above is directed to the substrate 4 containing the fabric-like member 6, wherein the first inorganic fillers exist on the surface of the fabric-like member 6.

In general, the thermal conductivity of the resin part 8 is lower than that of the fabric-like member 6. In addition, the thermal conductivity of the first inorganic fillers is higher than that of each of the resin part 8 and the fabric-like member 6. From these relations, there is a problem with low heat dissipation of the substrate 4 due to low thermal conductivity of the resin part 8. In the substrate 4 according to the present embodiment, however, the first inorganic fillers having a comparatively high thermal conductivity exist on the surface of the fabric-like member 6. Thus, compared to when the fabric-like member 6 and the resin part 8 are directly contacted with each other, it becomes easy to discharge heat from the fabric-like member 6 via the first inorganic fillers, and the substrate 4 can thereby have a high heat dissipation.

In the substrate 4 according to the present embodiment, the fabric-like member 6 is composed of glass.

Since the fabric-like member 6 is composed of glass, it is possible to obtain the substrate 4 being easily deformable and having a high bending strength. Moreover, since glass does not easily undergo thermal expansion and contraction and does not easily change in volume due to drying and swelling, glass is easy to handle in manufacturing the substrate 4 and using it.

Moreover, when the fabric-like member 6 is composed of glass, the substrate 4 tends to exhibit a low heat dissipation due to low thermal conductivity of glass. In the present embodiment, however, a composite fabric-like member 26 (the first inorganic fillers having a comparatively high thermal conductivity are attached on the fabric-like member 6) can be used for the substrate 4, and the heat dissipation of the substrate 4 can appropriately be secured even if the fabric-like member 6 is composed of glass.

In the substrate 4 according to the present embodiment, the first inorganic fillers are composed of at least one of boron nitride, aluminum oxide, aluminum nitride, and magnesium oxide.

This makes it possible to ensure an appropriate insulation for the substrate 4 while enhancing the heat dissipation of the substrate 4.

In the substrate 4 according to the present embodiment, each of the first inorganic fillers has a particle size smaller than a cross-sectional diameter of each of threads constituting the fabric-like member 6.

This makes it possible to arrange the first inorganic fillers closely to the intersection between the first threads 6a and the second threads 6b of the fabric-like member 6 and further makes it possible to increase the density of the first inorganic fillers. As a result of these effects, the heat dissipation of the substrate 4 can be further improved.

In the substrate 4 according to the present embodiment, each of the first inorganic fillers has a particle size of 1 μm or less.

This makes it possible to further enhance the heat dissipation of the substrate 4.

The substrate 4 according to the present embodiment further includes second inorganic fillers 16a (16b) having a particle size larger than that of each of the first inorganic fillers.

As mentioned above, the first inorganic fillers have a small particle size and can thereby be arranged closely to the intersections between the first threads 6a and the second threads 6b of the fabric-like member 6. On the other hand, compared to the first inorganic fillers, the second inorganic fillers 16a (16b) according to the present embodiment have a large particle size and are thereby arranged away from the intersections between the first threads 6a and the second threads 6b of the fabric-like member 6. As a result, the first inorganic fillers can be arranged to connect the second inorganic fillers 16a (16b) and the fabric-like member 6. Thus, the heat of the fabric-like member 6 is discharged to the second inorganic fillers 16a (16b) via the first inorganic fillers, and the heat dissipation of the substrate 4 can be further higher.

In the substrate 4 according to the present embodiment, each of the second inorganic fillers 16a has a scaly shape, and each of the second inorganic fillers 16a has a longitudinal length of 5 μm to 15 μm.

When each of the second inorganic fillers 16a has a scaly shape, each of the second inorganic fillers 16a has anisotropy in heat dissipation, that is, thermal conductivity. Specifically, the thermal conductivity of the scaly shape is higher in the longitudinal direction than in the transverse direction.

Thus, as shown in FIG. 2 and FIG. 3, the longitudinal ends of the second inorganic fillers 16a are preferably directed to the aggregates 14 of the first inorganic fillers. This makes it possible to favorably discharge heat from the fabric-like member 6 to the second inorganic fillers 16a via the first inorganic fillers.

In the substrate 4 according to the present embodiment, aggregates 14 of the first inorganic fillers exist on the surface of the fabric-like member 6.

This makes it possible to further enhance the heat dissipation of the substrate 4.

In the substrate 4 according to the present embodiment, the aggregates 14 of the first inorganic fillers exist closely to threads contained in the fabric-like member 6.

This makes it possible to further enhance the heat dissipation of the substrate 4.

The substrate 4 according to the present embodiment further includes second inorganic fillers 16a (16b) each having a particle size larger than that of each of the first inorganic fillers, wherein the aggregates 14 of the first inorganic fillers exist to connect the fabric-like member 16 and the second inorganic fillers 16a (16b).

Thus, the heat of the fabric-like member 6 is discharged to the second inorganic fillers 16a (16b) via the aggregates 14 of the first inorganic fillers, and the heat dissipation of the substrate 4 can be further higher.

In the substrate 4 according to the present embodiment, first threads 6a and second threads 6b are crossed and woven to form the fabric-like member 6, and at least one of the aggregates 14 of the first inorganic fillers are contained in intersections between the first threads 6a and the second threads 6b.

The intersections between the first threads 6a and the second threads 6b have a comparatively low heat dissipation in the fabric-like member 6. In the present embodiment, since at least one of the aggregates 14 of the first inorganic fillers are contained in the intersections between the first threads 6a and the second threads 6b, the heat dissipation of the substrate 4 can be further higher.

In the substrate 4 according to the present embodiment, the aggregates 14 of the first inorganic fillers exist in a range of 10 μm or more along the first threads 6a.

This makes it possible to further enhance the heat dissipation of the substrate 4.

In the substrate 4 according to the present embodiment, the aggregates 14 of the first inorganic fillers exist in a range of 5 μm or more from a transverse end of the first threads 6a in a direction perpendicular to a longitudinal direction of the first threads 6a.

This makes it possible to further enhance the heat dissipation of the substrate 4.

In the substrate 4 according to the present embodiment, at least one of the first inorganic fillers exist within a range of 1 μm or less from a transverse end of the first threads 6a in a direction perpendicular to a longitudinal direction of the first threads 6a.

This makes it possible to further enhance the heat dissipation of the substrate 4.

A multilayer substrate 2 according to the present embodiment is formed from two or more substrates 4.

This makes it possible to obtain the above-mentioned effects of the substrate 4 and to obtain a strong multilayer substrate.

Hereinbefore, an embodiment of the present invention is explained, but the present invention is not limited to the above-mentioned embodiment and may be modified in various embodiments within the scope of the present invention.

For example, the lamination number of substrates 4 of multilayer substrate 2 is not limited, but is preferably 2-10 in the present embodiment.

Moreover, one substrate 4 and one conductive layer 10 may not be laminated alternately. Specifically, one or more substrates 4 and one or more conductive layers 10 may be laminated alternately.

In the above-mentioned embodiment, the fabric-like member 6 is woven fabric, but may be non-woven fabric. In the above-mentioned embodiment, when the fabric-like member is woven fabric, it is woven in any manner. The fabric-like member 6 may be woven by plain weave, twill weave, sateen weave, etc.

In the above-mentioned embodiment, the fabric-like member 6 has a single layer structure where a first thread and a second thread are woven as shown in FIG. 1, but the fabric-like member 6 may be formed as a multilayer body where two or more fabric-like members shown in FIG. 4A are laminated.

EXAMPLES

Hereinafter, the present invention is explained in more detail with Examples, but is not limited thereto.

Example 1

A fiberglass woven fabric (manufactured by Arisawa Mfg. Co., Ltd., IPC standard 1080) was prepared as a fabric-like member 6.

A boron nitride was prepared as first inorganic fillers 24. The average particle size of the boron nitride was 1 μm.

The first inorganic fillers 24 were sprayed against the fabric-like member 6 with air brush. Then, a composite fabric-like member 26 was manufactured.

Next, a thermosetting resin (60 parts by weight), a curing agent (40 parts by weight), a curing accelerator (1 part by weight), and a solvent (50 parts by weight) were mixed to prepare a liquid mixture. The details of the thermosetting resin, the curing agent, the curing accelerator, and the solvent were as follows.

The thermosetting resin was epoxy resin (mixture of 50% tetramethylbiphenol type epoxy resin and 50% 4,4'-biphenol type epoxy resin, Mitsubishi Chemical Co., Ltd., YL-6121H);

The curing agent was 1,3,5-Tris (4-hydroxyphenyl) benzene (THPB); The curing accelerator was 2-Ethyl-4-methylimidazole (2E4MZ manufactured by Shikoku Kasei); and The solvent was methyl ethyl ketone.

The liquid mixture was mixed with a boron nitride (second inorganic fillers 16a) and a magnesium oxide (second inorganic fillers 16b) to prepare a resin paste. The boron nitride (second inorganic fillers 16a) was added to the resin paste so as to account for 10 vol % of a resin part 8 of the multilayer substrate 2 after completion. The magnesium oxide (second inorganic fillers 16b) was added to the resin paste so as to account for 50 vol % of the resin part 8 of the multilayer substrate 2 after completion.

The boron nitride (second inorganic fillers) had a scaly shape. The average longitudinal length of the boron nitride (second inorganic fillers) was 10 The magnesium oxide (second inorganic fillers) had an isotropic particle shape. The average particle size of the magnesium oxide (second inorganic fillers) was 10 μm.

After the resin paste was put into the composite fabric-like member 26, this mixture was dried to remove a solvent contained in the resin paste. The dry temperature was 100° C. The dry time was 0.5 hours.

A substrate green sheet obtained in such a manner was heated to 200° C. and hardened to obtain a substrate 4.

Next, as shown in FIG. 5A, a copper foil (conductive layer 10) was disposed on an end surface of the substrate in its thickness direction by heat pressing.

Next, as shown in FIG. 5B, the conductive layer 10 (copper foil) was patterned by etching to form a circuit.

After complexes of the substrate 4 and the conductive layer 10 obtained in such a manner were laminated as shown in FIG. 5C, these laminated complexes were pressed with heat (first time) and thereafter pressed with heat (second time) to obtain a multilayer substrate 2 shown in FIG. 1. Copper foils were arranged on both end surfaces of the multilayer substrate 2 in its lamination direction. The conditions of the heat pressings and the specific specifications of the multilayer substrate 2 were as below.

[Conditions of Heat Pressings]
First Heat Pressing
   Temperature: 170° C.
   Pressure: 1 MPa
   Time: 20 minutes
Second Heat Pressing
   Temperature: 200° C.
   Pressure: 4 MPa
   Time: 1 hour

[Specifications of Multilayer Substrate 2]
   Number of Substrates 4: six
   Thickness of Substrate 4 (Tp): 150 μm
   Thickness of Fabric-Like Member 6 (Tc): 50 μm
   Thickness of Conductive Layer 10 (Te): 50 μm The multilayer substrate 2 was cut to obtain a cross section (Z-X cross section) parallel to the longitudinal direction of the first threads 6a (X-axis direction) and to the lamination direction of the multilayer substrate 2 (Z-axis direction). The whole of the Z-X cross section was initially photographed by SEM at 80 times and subsequently photographed by SEM at 2500 times so that intersections of the first threads 6a and the second threads 6b were contained.

The SEM pictures confirmed that the aggregates 14 of the first inorganic fillers existed in a range of 10 μm or more along the first threads 6a and 5 μm or more from a transverse end of the first threads 6a in a direction perpendicular to a longitudinal direction of the first threads 6a. The SEM pictures also confirmed that the aggregates 14 of the first inorganic fillers existed in a range of 1 μm or less from a transverse end of the first threads 6a in a direction perpendicular to a longitudinal direction of the first threads 6a. The SEM pictures also confirmed that at least one of the aggregates 14 of the first inorganic fillers were contained in the intersections.

[Thermal Conductivity of Substrate]

The multilayer substrate 2 was cut to make circular samples for measurement (diameter: 10 mm, thickness: 0.87-0.9 mm).

Next, a thermal diffusion coefficient α (m²/s) of each of the samples for measurement was measured with a thermal conductivity measuring device (TC series manufactured by Advance Riko Co., Ltd.).

A specific heat Cp of each of the samples for measurement was measured with sapphire as the standard sample by differential scanning calorimetry (DSC).

Moreover, a density r of the samples for measurement was measured by archimedes method.

The obtained values were assigned to the following formula. Then, a thermal conductivity λ. (W/(m·K)) was calculated. The results are shown in Table 1.

$$\lambda = \alpha \times Cp \times r$$

λ: Thermal Conductivity (W/(m·K))
   α: Thermal Diffusion Coefficient (m²/s)
   Cp: Specific Heat (J/kg·K)
   r: Density (kg/m³)

Example 2

Except for changing the spray time of air brush in manufacturing a composite fabric-like member 26, a multilayer substrate 2 was manufactured as with Example 1.

A SEM picture of the obtained multilayer substrate 2 containing intersections of the first threads 6a and the second threads 6b was photographed as with Example 1. The SEM picture confirmed that the aggregates 14 of the first inorganic fillers existed in a range of 10 μm or more along the first threads 6a and 5 μm or more from a transverse end of the first threads 6a in a direction perpendicular to a longitudinal direction of the first threads 6a. The SEM pictures also confirmed that the aggregates 14 of the first inorganic fillers existed in a range of 1 μm or less from a transverse end of the first threads 6a in a direction perpendicular to a longitudinal direction of the first threads 6a. The SEM pictures also confirmed that at least one of the aggregates 14 of the first inorganic fillers were contained in the intersections 12.

A thermal conductivity of the obtained multilayer substrate 2 was measured as with Example 1. The results are shown in Table 1.

Comparative Example 1

Except for using a fabric-like member 26 on which no first inorganic fillers were attached, a multilayer substrate 2 was manufactured as with Example 1. A thermal conductivity of the obtained multilayer substrate 2 was measured as with Example 1. The results are shown in Table 1.

Comparative Example 2

Except for using a fabric-like member 26 on which no first inorganic fillers were attached and adding no second inorganic fillers, a multilayer substrate 2 was manufactured as with Example 1. A thermal conductivity of the obtained multilayer substrate 2 was measured as with Example 1. The results are shown in Table 1.

TABLE 1

| | Conditions of Fabric-Like Member | Presence of Second Inorganic Fillers | Presence of Aggregates of First Inorganic Fillers Existing in Intersections | Thermal Conductivity [W/(m · K)] |
|---|---|---|---|---|
| Ex. 1 | composite fabric-like member | yes | yes | 3.01 |
| Ex. 2 | composite fabric-like member | yes | yes | 2.69 |
| Comp. Ex. 1 | fabric-like member (no first inorganic fillers were attached) | yes | no | 2.67 |
| Comp. Ex. 2 | fabric-like member (no first inorganic fillers were attached) | no | no | 0.5 |

Table 1 confirmed that the multilayer substrates 2 manufactured using the fabric-like member 26 (Examples 1 and 2) had a thermal conductivity being higher than that of each of the multilayer substrates 2 manufactured using the fabric-like member 6 on which no first inorganic fillers were attached (Comparative Examples 1 and 2).

In Examples 1 and 2, it is conceivable that the heat of the fabric-like member 6 was easily discharged by the existence of boron nitride (first inorganic fillers), which had a high thermal conductivity, on the surface of the fabric-like member 26. It is consequently conceivable that the heat dissipation of the multilayer substrate 2 was improved.

DESCRIPTION OF THE REFERENCE NUMERICAL

2 . . . multilayer substrate
4, 4a, 4b, 4c . . . substrate
6 . . . fabric-like member
6a . . . first thread
6b . . . second thread
8 . . . resin part
10 . . . conductive layer
14 . . . aggregate of first inorganic filler
24 . . . first inorganic filler
16a, 16b . . . second inorganic filler
18 . . . resin
26 . . . composite fabric-like member

What is claimed is:

1. A substrate comprising a woven fabric and/or non-woven fabric member and second inorganic fillers, wherein first inorganic fillers exist on a surface of the woven fabric and/or non-woven fabric member,
   wherein the second inorganic fillers each having a particle size larger than that of each of the first inorganic fillers,
   wherein aggregates of the first inorganic fillers exist on the surface of the woven fabric and/or non-woven fabric member, and
   wherein the aggregates of the first inorganic fillers exist to connect the woven fabric and/or non-woven fabric member and the second inorganic fillers.

2. The substrate according to claim 1, wherein the woven fabric and/or non-woven fabric member comprises glass.

3. The substrate according to claim 1, wherein the first inorganic fillers comprise at least one of boron nitride, aluminum oxide, aluminum nitride, and magnesium oxide.

4. The substrate according to claim 1, wherein each of the first inorganic fillers has a particle size smaller than a cross-sectional diameter of each of threads constituting the woven fabric and/or non-woven fabric member.

5. The substrate according to claim 1, wherein each of the first inorganic fillers has a particle size of 1 μm or less.

6. The substrate according to claim 1, wherein each of the second inorganic fillers has a scaly shape, and each of the second inorganic fillers has a longitudinal length of 5 μm to 15 μm.

7. The substrate according to claim 1, wherein the aggregates of the first inorganic fillers exist closely to threads contained in the woven fabric and/or non-woven fabric member.

8. The substrate according to claim 1, wherein
   first threads and second threads are crossed and woven to form the woven fabric and/or non-woven fabric member, and
   at least one of the aggregates of the first inorganic fillers are contained in intersections between the first threads and the second threads.

9. The substrate according to claim 1, wherein the aggregates of the first inorganic fillers exist in a range of 10 μm or more along the first threads.

10. The substrate according to claim 1, wherein the aggregates of the first inorganic fillers exist in a range of 5

μm or more from a transverse end of the first threads in a direction perpendicular to a longitudinal direction of the first threads.

11. The substrate according to claim 1, wherein at least one of the first inorganic fillers exist within a range of 1 μm or less from a transverse end of the first threads in a direction perpendicular to a longitudinal direction of the first threads.

12. A multilayer substrate comprising two or more laminated substrates according to claim 1.

* * * * *